United States Patent Office 3,703,531
Patented Nov. 21, 1972

3,703,531
MANUFACTURE OF BASIC NITROGEN AND HYDROXYL CONTAINING EPOXIDE RESINS
Martin Cherubim, Rheinkampeick, Horst Giehring, Hamburg, and Wilhelm Neier, Homberg, Germany, assignors to Deutsche Texaco Aktiengesellschaft (formerly Rhienpreussen A.G.), Mittelweg, Germany
No Drawing. Filed May 12, 1971, Ser. No. 142,812
Claims priority, application Germany, May 14, 1970, P 20 23 571.6
Int. Cl. C07d 1/04
U.S. Cl. 260—348.6
2 Claims

ABSTRACT OF THE DISCLOSURE

Method of producing light colored basic nitrogen and hydroxyl containing epoxide resins having an epoxide equivalent of from 90 to 1500 comprising first contacting an alkyl primary amine of from 1 to 6 carbons with epichlorohydrin in the presence of di-secondary-butylether and second contacting the formed chlorohydrin intermediate with an alkali metal hydroxide in the presence of di-secondary-butylether and/or methyl ethyl ketone.

BACKGROUND OF INVENTION

The present invention broadly relates to a process for the production of basic nitrogen and hydroxy groups containing epoxide resins having an epoxy equivalent of between 90 and 1500 manufactured from aliphatic primary amines and epichlorohydrin.

The epoxide resin products manufactured by the process contemplated herein may be characterized as polymerized mixtures of diglycidylalkylamine, hereafter referred to as DGAA represented by the following formula

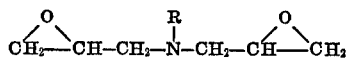

where R is a lower alkyl group, and N,N'-diglycidyl-N,N'-dialkyldiamino-hydroxyalkane, hereafter referred to as DDDH represented by the following formula

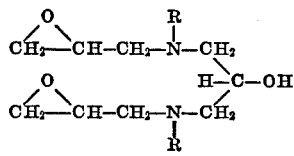

As disclosed in co-assigned co-pending application Ser. No. 62,692, filed Aug. 10, 1970 the DGAA-DDDH epoxide resins cure much faster with dicarboxylic acid anhydrides than the epoxide resins based on DGAA alone. This effect is likely to be due to the hydroxyl groups present in the DDDH. In fact the DGAA-DDDH epoxide resin mixtures not only cure much faster but the products obtained also have superior final hardness. Therefore the DGAA-DDDH epoxide resins are of the greatest technological interest.

The hardened DGAA-DDDH epoxide resin mixtures find use as protective coatings, films, structural plastics and as adhesives among other applications.

The preparation of DGAA-DDDH epoxide resins by reacting aliphatic amines with epichlorohydrin and subsequently treating the reaction product with alkali metal hydroxide is broadly known and disclosed in German Pat. 1,132,146 (Frank et al.). The prior process employed a large variety of solvents such as aromatic hydrocarbons, ketones and alcohols, however the epoxide resin products thereby were all undesirably deeply colored due to the highly exothermal nature of the reaction. Further, these prior processes required considerable technical equipment which is an undesirable feature from a cost and control standpoint.

DESCRIPTION OF THE INVENTION

It has been discovered and this constitutes the invention a method of preparing DGAA-DDDH epoxide resins having substantially lighter color than heretofore attainable by prior methods while simultaneously employing a reduced amount of technical equipment. More specifically it has been found in the particular combination of process steps, conditions and ingredients subsequently described, the employment of di-secondary-butylether in the first contacting quite surprisingly strongly inhibits the coloring of the reaction product thereby resulting in products of only a slightly yellow color as opposed to the less desirable deeply colored (e.g. dark brown) products produced by the methods of the prior art.

More specifically it has been found that a basic nitrogen and hydroxyl group containing epoxide resins of only slightly yellow color having an epoxide equivalent within the range of between about 90 and 1500 may be obtained from aliphatic amines and epichlorohydrin by first contacting one mole alkyl amine represented by the formula R—NH$_2$, where R is a lower alkyl group, i.e. of 1 to 6 carbons with about 2 to 10 moles of epichlorohydrin in the presence of 10 to 500 grams (between about 1 and 65 weight percent basis the first contacting reaction mixture) of di-secondary-butylether at a temperature ranging between about 20 and 80° C. and treating the so produced chlorohydrin intermediate compounds with between about 2 and 5 moles of solid alkali metal hydroxide in the presence of 100 to 1,000 grams (between about 8 and 85 weight percent basis second contacting mixture) of di-secondary-butylether and/or methyl ethyl ketone at a temperature below 80° C., e.g. between 20 and 80° C.

In a preferred embodiment of the present invention the aliphatic amine reacted with the epichlorohydrin has from 3 to 4 carbon atoms. A particularly suitable aliphatic amine was found to be isopropyl amine.

In the first contacting, that is, the reaction of the amine with epichlorohydrin is preferably conducted in a continuous process in a reaction tube this being particularly favorable with respect to the heat emission and considerable reducing of the reaction time.

Di-secondary-butylether may also be used when subsequently second contacting the reaction mixture with alkali hydroxide. However the removal of unconsumed epichlorohydrin together with di-secondary-butylether by distillation has proved to be advantageous.

To aid in purifying the DGAA-DDDH epoxide product and remove the residue of di-secondary-butylether it is advantageous to dissolve the raw product in the second contacting in methyl ethyl ketone and treat with the solid alkali hydroxide.

Examples of the aliphatic amine contemplated herein are methylamine, ethylamine, propylamine, isopropylamine, butylamine, isobutylamine, pentylamine and hexylamine.

Examples of the alkali metal hydroxides contemplated herein are lithium hydroxide, potassium hydroxide and sodium hydroxide.

The following examples further illustrate the process of this invention but are not to be construed as limitations thereof:

EXAMPLE 1

203.7 g. (2.2 moles) of epichlorohydrin are charged to a stirred vessel and heated to 30° C. with stirring. Three tenths of a mixture of 59 g. (1 mole) of isopropylamine and 20 g. of di-sec.-butylether are added thereto and the whole is permitted to react for 4 hours at 30° C. The remainder seven tenths of said mixture are then added thereto over a period of 8 hours, and the whole is permitted to react for another 4 hours at 30° C. Then a vacuum is created (12–13 Torr), the temperature is increased to a temperature of 40° C. which is maintained for 1 hour. This results in approximately 18 g. of di-sec.-butylether containing about 45 wt. percent of epichlorohydrin being removed by distillation. The residue is then dissolved in 500 cm.³ of methyl ethyl ketone at a temperature between 20 and 25° C. To this solution are added portion-wise with stirring within 3 hours 88 g. (2.2 moles) of sodium hydroxide in the form of tablets, with the temperature being maintained at 25° C. The temperature is then increased and the mixture permitted to react for another hour at reflux temperature, whereafter the reaction mixture is cooled and the sodium chloride precipitate filtered off together with the non-converted sodium hydroxide. From the filtrate now being free from salt and sodium hydroxide the major amount of methyl ethyl ketone is removed by distillation under normal pressure, and the remainder methyl ethyl ketone and di-sec.-butyl ether distilled off in vacuo. 159.1 g., corresponding to 93% of theory, of a slightly yellow epoxide resin composition having an epoxide equivalent of 121 are obtained.

EXAMPLE 2

203.7 g. (2.2 moles) of epichlorohydrin are charged to a stirred vessel and heated to 30° C. with stirring. Next, 30 wt. percent of a mixture of 59 g. isopropylamine (1 mole) and 50 g. di-sec.-butylether are added with vigorous stirring over a period of 4 hours at 30° C. Subsequently the whole is permitted to react at 30° C. The remainder 70% of the mixture of isopropylamine and di-sec.-butylether are added over a period of about 15 hours. After that the reaction is continued at 30 °C. for another 4 hours. This is followed by creating a vacuum (12–13 Torr) and increasing the temperature to 40° C. maintained for 1 hour, under which conditions a large portion of the solvent and epichlorohydrin is distilled off. The reaction mixture is then dissolved in 500 cm.³ of methyl ethyl ketone and, as in Example 1, reacted with sodium hydroxide and processed. 163.1 g., corresponding to 95.3% of theory, of a slightly yellow epoxide resin composition having an epoxide equivalent of 113 are obtained.

EXAMPLE 3

203.7 g. (2.2 moles) of epichlorohydrin are charged to a stirred vessel and heated to 30° C. with stirring. Three tenths of a mixture of 59 g. (1 mole) of i-propylamine and 50 g. of xylene are added thereto and the whole is permitted to react for 4 hours at 30° C.

The remainder seven tenths of said mixture of i-propylamine and xylene are added thereto over a period of about 15 hours, whereafter the reaction mixture is permitted to react for another 4 hour period at 30° C.

This is followed by creating a vacuum (12–13 Torr) and increasing the bottom temperature to a temperature of 40° C. which is maintained for 1 hour, whereby part of the epichlorohydrin and a smaller portion of the xylene are distilled off. The residue is dissolved in 500 cm.³ of methyl ethyl ketone at a temperature ranging between 20 and 25° C.

To this solution 8 g. (2.2 moles) of sodium hydroxide in the form of tablets are added portion-wise with stirring within three hours, while the temperature is maintained at 25° C. After that the temperature is increased and the reaction mixture is permitted to react for another hour at reflux temperature. The reaction mixture is then cooled and the precipitated sodium hydroxide removed by filtration. From the filtrate which is now free from salt and sodium hydroxide the major portion of the methyl ethyl ketone is distilled off under atmospheric pressure and the remainder methyl ethyl ketone and xylene are distilled off in vacuo. 159 g., corresponding to 93% of theory, of a brown epoxide resin composition having an epoxide equivalent of 126 are obtained.

We claim:

1. A process for the production of basic nitrogen hydroxyl group containing epoxide resins of improved color having an epoxide equivalent from 90 to 1500 from aliphatic amines and epichlorohydrin comprising first contacting alkylamine of the formula R—NH$_2$ where R is a lower alkyl with epichlorohydrin in the presence of di-secondary-butyl-ether at a temperature between about 20 and 80° C. and contacting the formed chlorohydrin intermediate at a temperature below about 80° C. with solid alkali metal hydroxide in the presence of a member selected from the group consisting of di-secondary-butyl-ether or methylethyl ketone, said first contacting conducted utilizing a mole ratio of said alkylamine to said epichlorohydrin of between about 1:2 and 1:10 and having a di-secondary-butylether content of between about 1 and 65 weight percent basis the first contacting reaction mixture and in said second contacting conducted utilizing between about 2 to 5 moles of alkali metal hydroxide per mole of said alkylamine in the presence of between about 8 and 85 weight percent of said member basis the second contacting reaction mixture.

2. A process in accordance with claim 1 wherein said alkylamine is isopropylamine, said alkali metal hydroxide is sodium hydroxide and said liquid is methylethyl ketone.

References Cited

UNITED STATES PATENTS 2,891,970   6/1959   Frank et al. _____ 260—348.6
3,475,458   10/1969   McClure et al. _____ 260—348 R

FOREIGN PATENTS 1,132,146   6/1962   Germany.

NORMA S. MILESTONE, Primary Examiner

U.S. Cl. X.R.

260—2 EP